UNITED STATES PATENT OFFICE.

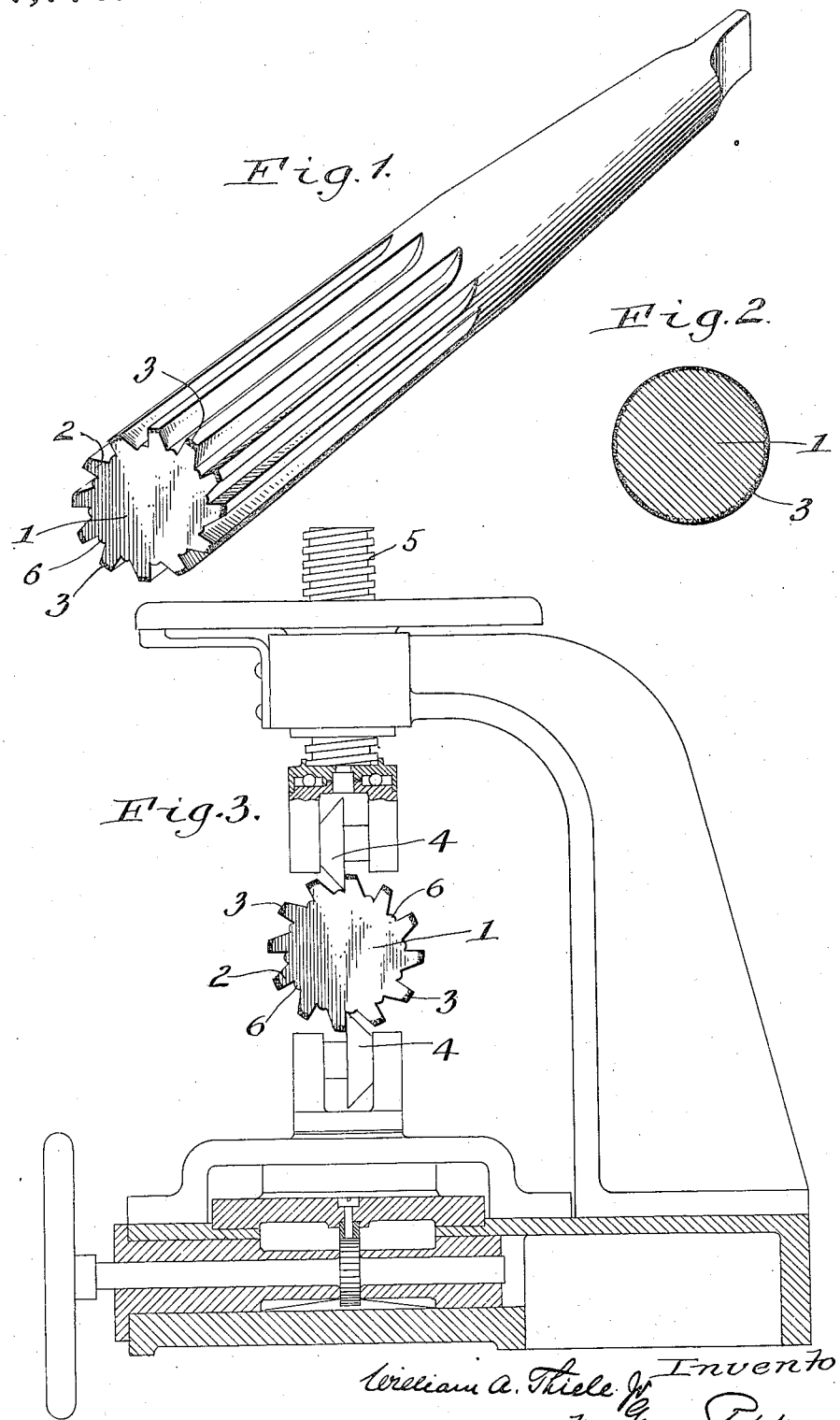

WILLIAM A. THIELE, JR., OF NORTH TONAWANDA, NEW YORK.

METHOD OF MAKING REAMERS.

1,277,770.  Specification of Letters Patent.  Patented Sept. 3, 1918.

Application filed January 12, 1918. Serial No. 211,516.

*To all whom it may concern:*

Be it known that I, WILLIAM A. THIELE, Jr., a citizen of the United States, residing at North Tonawanda, in the county of Niagara and State of New York, have invented new and useful Improvements in Methods of Making Reamers, of which the following is a specification.

In the manufacture of reamers and taps as ordinarily practised, the cylindrical rod or blank, after being roughly turned to the desired diameter, is grooved or fluted by means of an ordinary fluting cutter to produce the usual teeth or cutting edges. The fluted blank is then carbonized, hardened or annealed and ground down to the proper diameter. Should the fluted rod after carbonization and hardening be out of true more or less, it is necessary to straighten it in the customary press.

In a tap or reamer produced by this old method, the entire surface-film or layer of the metal is hardened to a greater or less depth, because the carbonizing and hardening steps take place after the blank has been fluted. The result is that in attempting to straighten the tool, if bent, it is liable to break on account of the hardness of its entire surface. It is also practically impossible to expand such a tool to restore it to its original diameter after becoming worn.

The object of my invention is the production of a tool of this character which can be straightened without danger of breakage, and which when worn, can be repeatedly expanded to its original or proper diameter, thus prolonging the life of the tool and effecting an important saving.

In the accompanying drawings:

Figure 1 is a perspective view of a reamer embodying the invention. Fig. 2 is a cross section of the blank after being carbonized and before being fluted. Fig. 3 is an end view of the finished reamer showing diagrammatically one form of apparatus which may be used for expanding the tool when worn.

Similar characters of reference indicate corresponding parts in the several views.

In producing a reamer, the tap or similar fluted tool according to this improved process, a cylindrical rod or blank 1 is rough-turned in a lathe to reduce it to the desired approximate diameter in the usual manner. The blank is next carbonized in any suitable or well known manner, say to a depth of about one-sixteenth of an inch, after which it is grooved or fluted by a suitable cutter or milling tool, to form the cutting teeth 2. The fluted blank is then hardened or annealed in the usual manner. Should the blank be untrue after these operations, it is straightened in an arbor press or other appropriate machine. It is then ground down to the proper diameter in the ordinary way, and finally its teeth are backed off by grinding to the form shown in Fig. 3. The carbonized film or surface of the blank is indicated at 3 in the drawings, its thickness being exaggerated for clearness.

As the flute-cutting step of this process follows the carbonizing step, only those portions of said film which form the outer or cutting edges of the teeth remain carbonized, the fluting cutter removing the carbonized portions between the teeth. The result is that upon next subjecting the blank to the hardening step, only the carbonized outer edges or portions of the teeth are hardened while their remaining portions and the body of the tool remain relatively soft and malleable. Owing to this soft condition, the tool when reduced in diameter by wear, can be expanded and restored to its original diameter. Such expansion may be effected by any suitable means. For example, it may be done by delivering blows with a peening hammer against the bottoms of the flutes, or by exerting the necessary pressure against them successively, or simultaneously against the bottoms of diametrically-opposite flutes, by pressure rollers 4, as shown in Fig. 3. In the latter case the reamer may be rotatably supported by a pair of lathe-centers and turned intermittently to successively present opposing sets of its flutes to the pressure rollers, the centers being mounted on a carriage movable lengthwise of the flutes and the upper roller being carried by a pressure screw 5.

By this action, the metal forming the flute-bottoms is displaced inwardly, with the result that the adjacent metal is displaced outwardly, thereby expanding the toothed portions of the tool. Should the tool be expanded to an excessive diameter by this operation, it may be reduced to the exact diameter required by grinding. The tool may be repeatedly expanded in this manner and in order to afford ample metal for this purpose, the bottoms of the flutes are preferably cut convex, as shown at 6.

It will be understood that this method is especially applicable to taps or reamers in which a comparatively small amount of expansion is necessary to restore them to their original diameter after wear. By this process, reamers one inch in diameter and worn down about twenty-five thousandths of an inch have been successfully expanded to their original condition by the use of an ordinary peening hammer. In larger reamers the range of expansion is greater in protion to their diameter.

This improvement not only effects a considerable saving by prolonging the life of the tool, but it has been found in practice that the tool reams a more perfect hole than an ordinary tool of this kind.

I claim as my invention:

1. The hereindescribed method of making a fluted tool of the character mentioned, which consists in carbonizing a metal blank, fluting the same to form the cutting teeth, and then hardening the fluted blank.

2. The hereindescribed method of making a fluted tool of the character mentioned, which consists in carbonizing a metal blank to a suitable depth over its entire surface, cutting flutes therein to form the cutting teeth and remove all portions of said carbonized surface except those covering the outer ends of the teeth, and then hardening the fluted blank.

WILLIAM A. THIELE, Jr.